Figure 8:
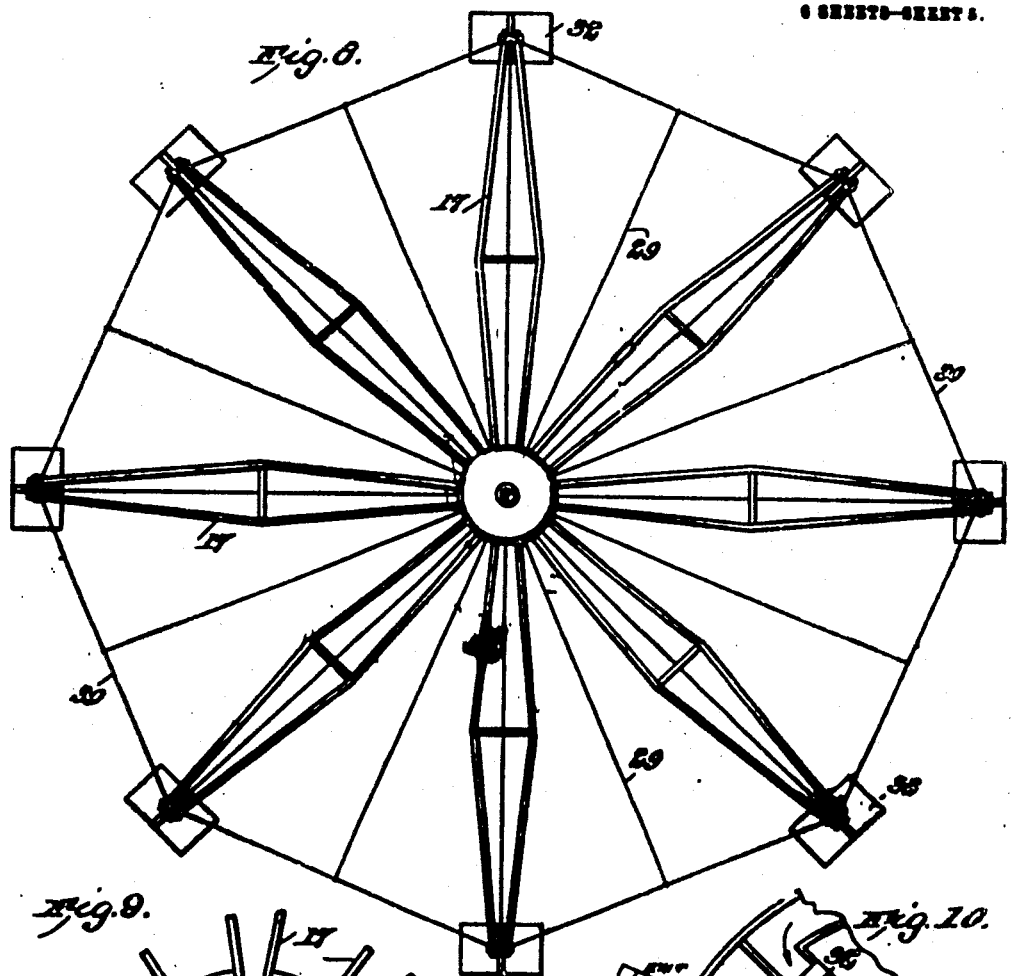

V. H. DAVISON.
OBSERVATION ROUNDABOUT.
APPLICATION FILED AUG. 16, 1910.
982,128.
Patented Jan. 17, 1911.
6 SHEETS—SHEET 1.
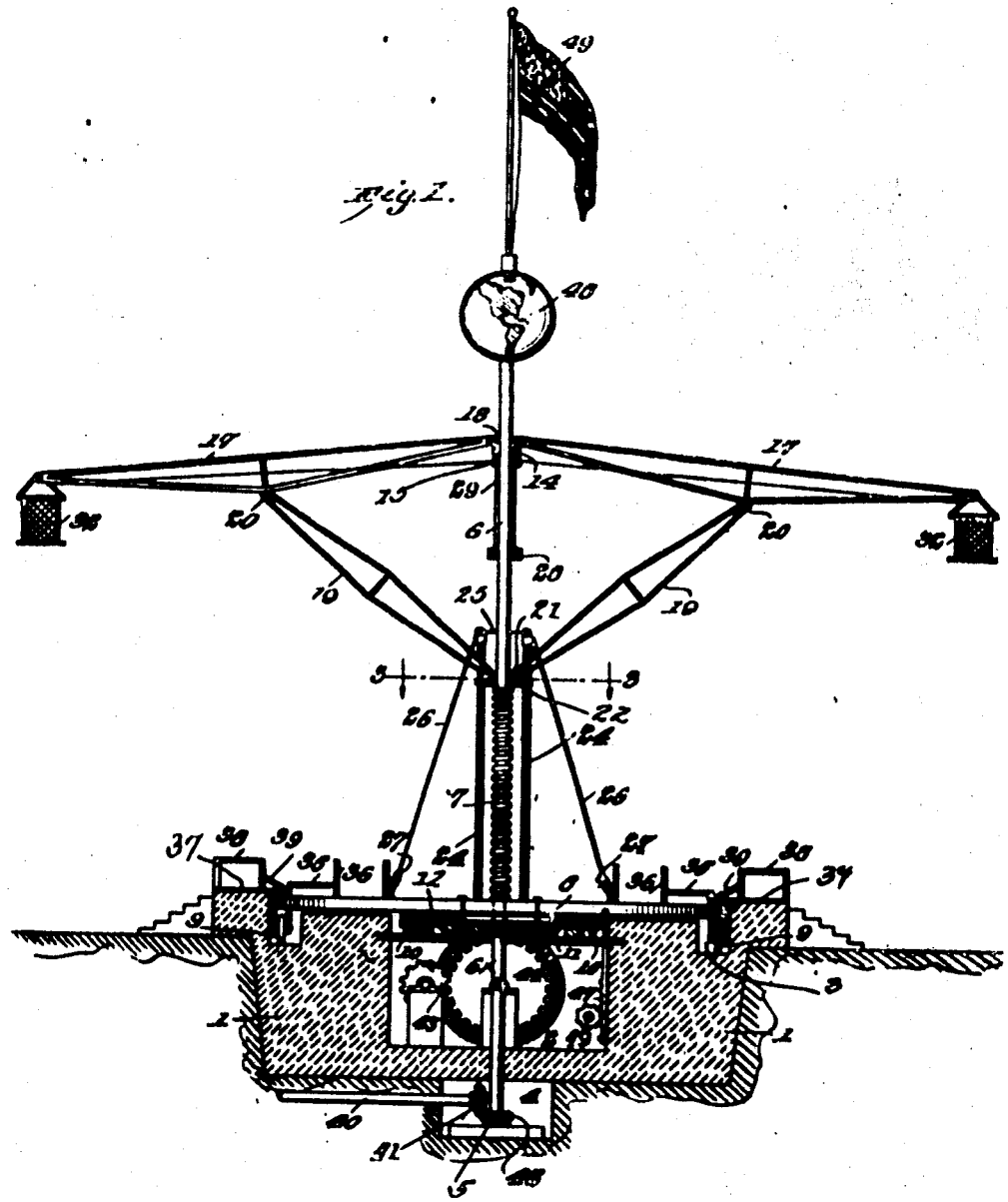
WITNESSES:
INVENTOR
Vincent H. Davison
BY Munn & Co.
ATTORNEYS

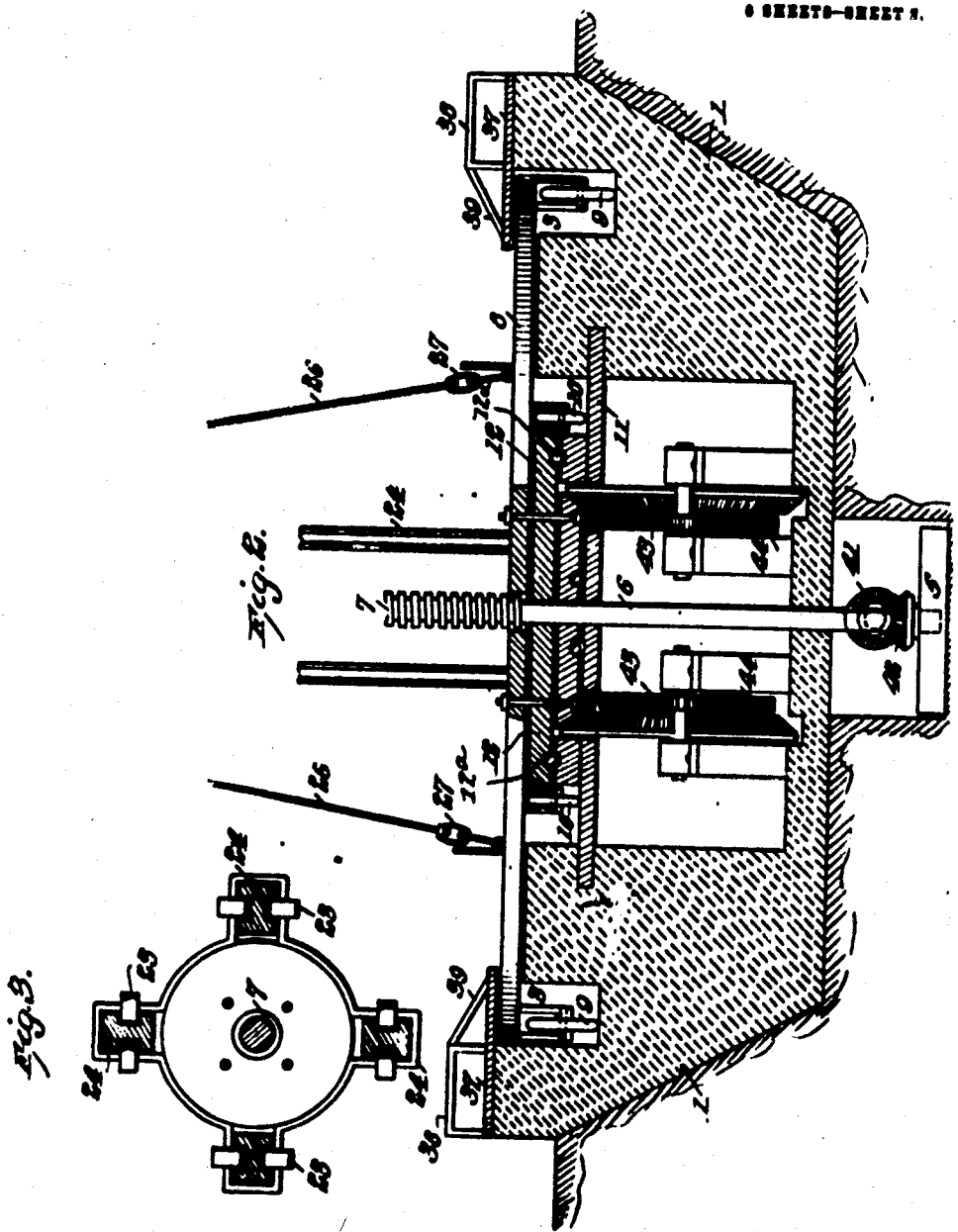

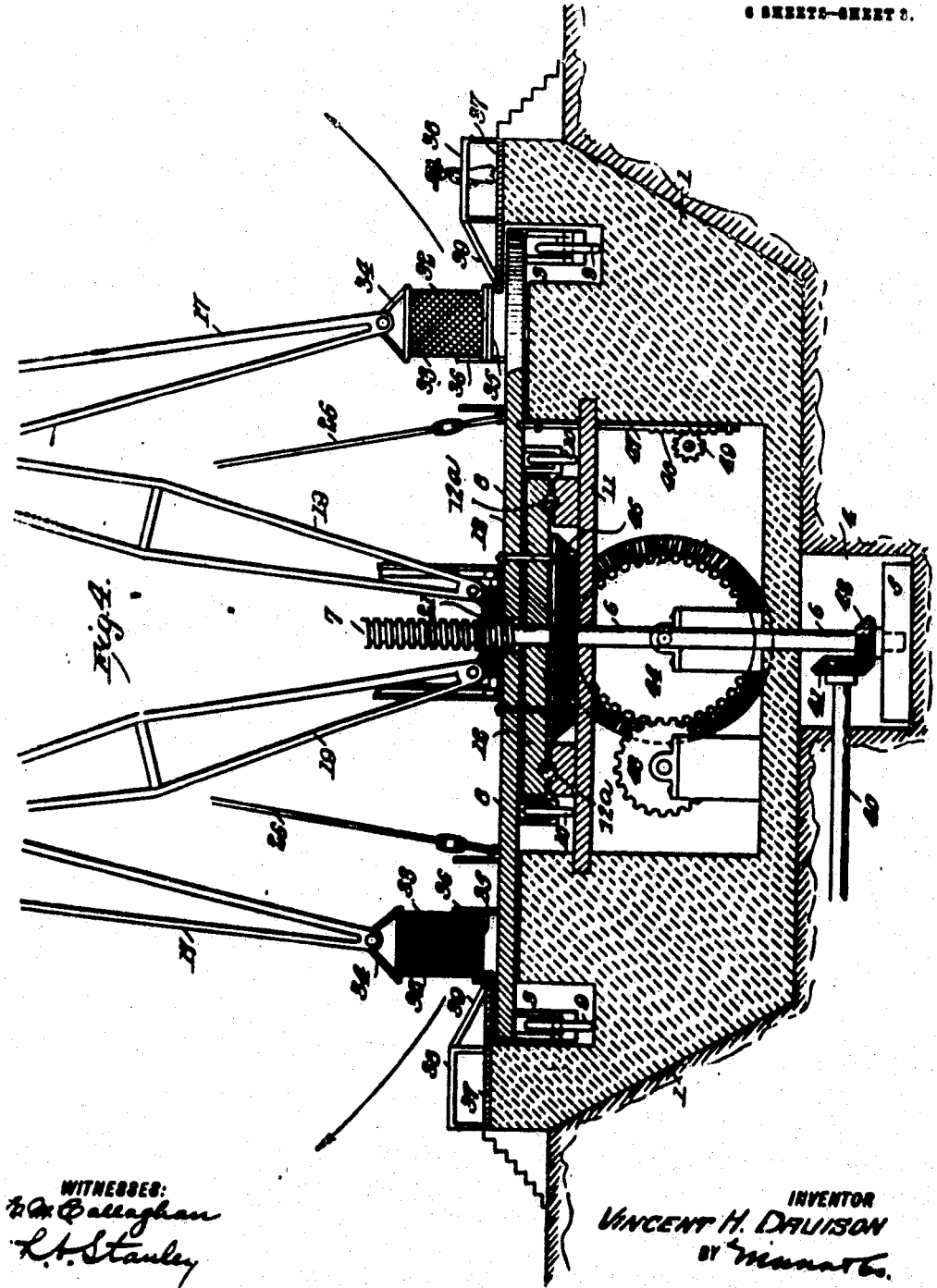

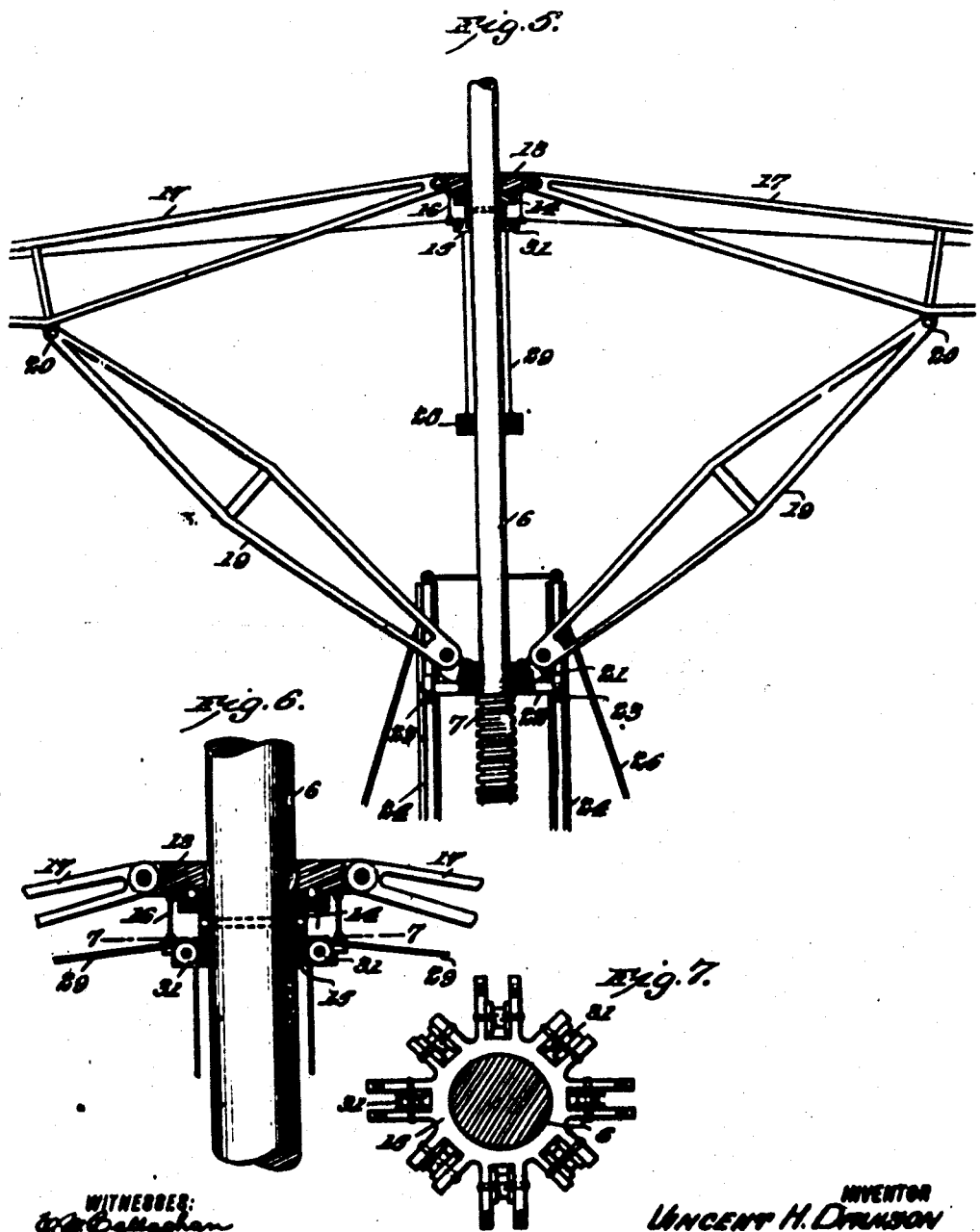

V. H. DAVISON.
OBSERVATION ROUNDABOUT.
APPLICATION FILED AUG. 10, 1910.

982,128.

Patented Jan. 17, 1911.
6 SHEETS—SHEET 5.

INVENTOR
Vincent H. Davison
ATTORNEYS

V. H. DAVISON.
OBSERVATION ROUNDABOUT.
APPLICATION FILED AUG. 16, 1910.

982,128.

Patented Jan. 17, 1911.
6 SHEETS—SHEET 6.

WITNESSES:

INVENTOR
Vincent H. Davison
BY Munn & Co.
ATTORNEYS

UNITED STATES PATENT OFFICE.

VINCENT H. DAVISON, OF GOLDFIELD, NEVADA.

OBSERVATION-ROUNDABOUT.

982,128.    Specification of Letters Patent.    Patented Jan. 17, 1911.

Application filed August 16, 1910. Serial No. 577,415.

*To all whom it may concern:*

Be it known that I, VINCENT H. DAVISON, a citizen of the United States, and a resident of Goldfield, in the county of Esmeralda and State of Nevada, have made certain new and useful Improvements in Observation-Roundabouts, of which the following is a specification.

My invention relates to improvements in amusement devices, and it consists in the combinations, constructions and arrangements herein described and claimed.

The main object of my invention is to provide an amusement device, which is especially adapted for use at fairs, expositions, etc., whereby a large number of people may be entertained.

A further object of my invention is to provide a sightseeing structure which is capable of elevating a number of people to a considerable height above the ground, and then rotating so as to give the patrons a good view of the exposition grounds and the surrounding country.

A further object of my invention is to provide a carrier fashioned somewhat according to an umbrella with cars suspended from the ends of the rib-like beams and the novel features consist, especially in means for raising and lowering the arms, and for rotating the device after the arms have been raised.

Other objects and advantages will appear in the following specification, and will be particularly pointed out in the appended claims.

My invention is illustrated in the accompanying drawings forming part of this application, in which similar reference characters indicate like parts in the several views and in which—

Figure 9:
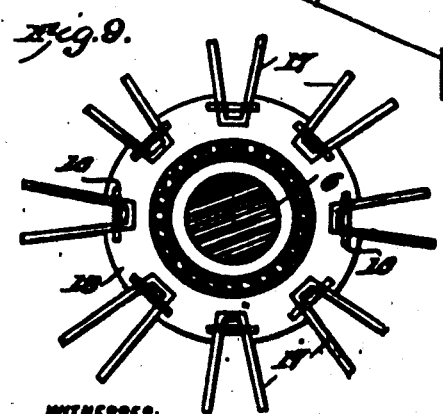
Figure 10:
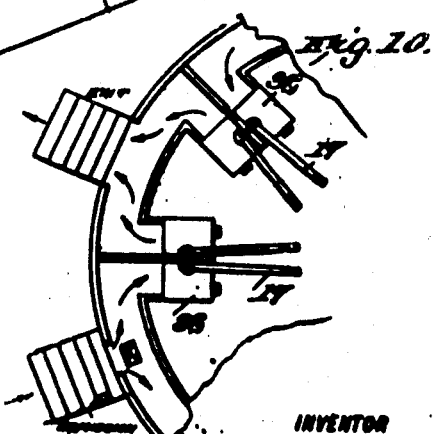
Figure 21:
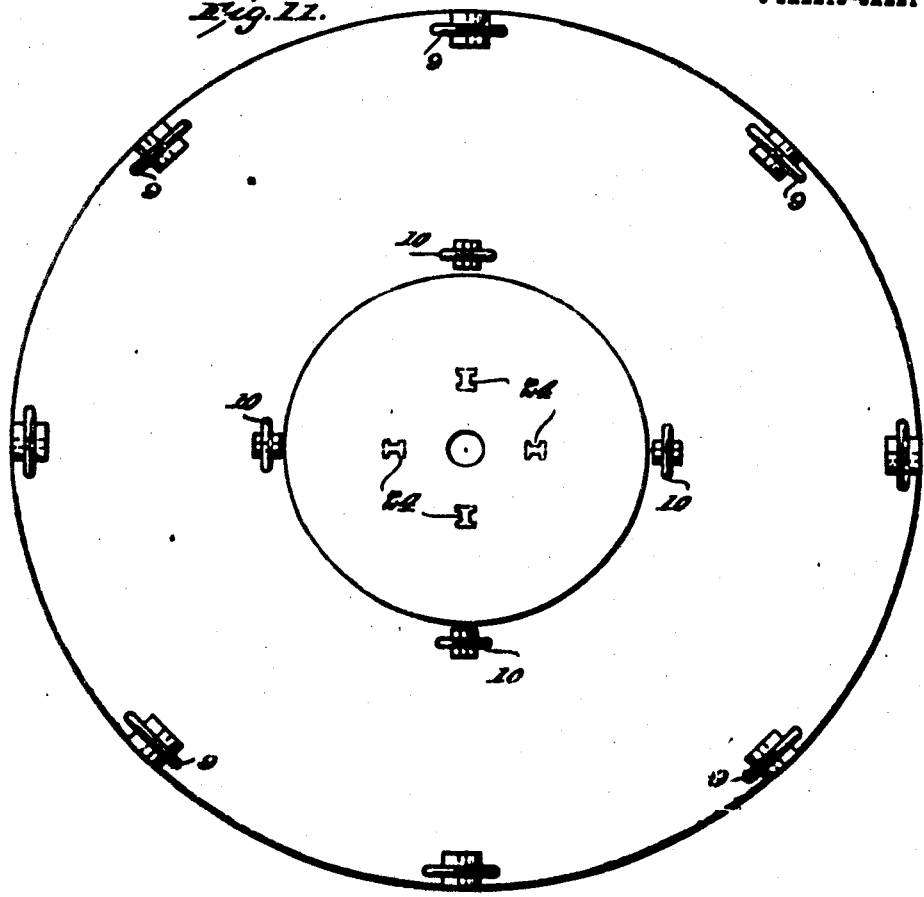
Figure 22:
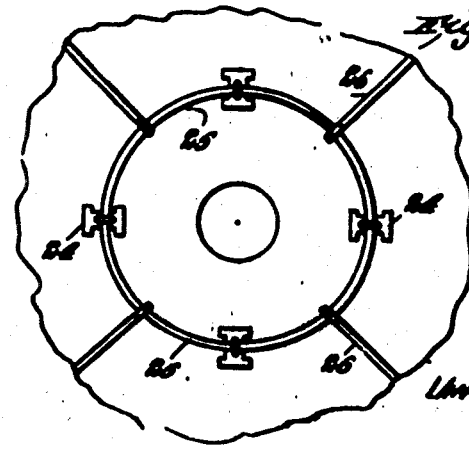

Figure 1 is a side view of my improved device with the arms extended, the supports therefor being shown in section, Fig. 2 is an enlarged sectional view of the base portion of the device, Fig. 3 is a section through the device on the line 3—3 of Fig. 1, looking in the direction of the arrows, Fig. 4 is a section through the device at right angles to that shown in Fig. 2, Fig. 5 is a vertical section through a portion of the device showing the means for supporting the arms and for elevating them, Fig. 6 is a detail sectional view through the arm supporting means, Fig. 7 is a section along the line 7—7 of Fig. 6, looking in the direction of the arrow. Fig. 8 is a plan view of the upper portion of the device showing the arm extended, Fig. 9 is a bottom view of the supporting collar showing the means for attaching the arms thereto, Fig. 10 is a plan view of a portion of the annular platform, showing the admission and exit passages, Fig. 11 is a bottom view of the revolving base, and Fig. 12 is a plan view of the guides showing the means for bracing the same at their tops.

In carrying out my invention, I provide a concrete or masonry substructure 1 for suspending the great weight of the device. This structure is provided with a central chamber 2 and with an annular run-way 3, as shown in Fig. 1. Below the substructure is a chamber 4 for the accommodation of a portion of the driving mechanism, as will be explained later. In the chamber 4 is a footing 5, designed to receive the end thrust of a shaft 6, which extends upwardly through the base and is provided with a threaded portion 7. Loosely disposed about the shaft 6 is a circular platform 8, which is provided with supporting wheels 9 arranged to move in the run-way 3. Secured also to the under side of the platform 8 are smaller wheels 10, which bear upon a plate 11 placed across the top portion of the chamber 2. From Fig. 4 it will be seen that I have provided a bearing plate 12, which is supported on the ball bearings 12ª.

The main shaft 6 is provided, near its upper part, with a collar 13 (see Figs. 1, 5 and 6) which loosely surrounds the shaft 6, and is carried by the ball bearings upon a collar 14, which is fixed to the shaft. A second collar 15 is suspended from the collar 13 by means of the links 16. To the upper collar 13 is pivotally attached a series of outwardly extending arms 17, these arms being secured by means of pivot pins 18 as clearly shown in Fig. 9. The arms 17 are raised and lowered by means of the movable arms or braces 19, which are hinged at 94 to the arms 17 at one end and at the other end to a collar 21. The latter is threaded to engage the threads 7 on the shaft 6, and has secured to it a spider 22 of the shape shown in Fig. 3. This spider bears eight guide rollers 23, which are arranged to engage four grooved guides 24, as shown in Fig. 8. The construction of these guides is best shown in Figs. 1, 2 and 5. They consist of I-shaped beams, which are secured at the bottom to the platform 8 and are held together at their tops by means of the circular member 25. This brace member is secured by the guy rods 26, the latter being secured to the platform 8 by means of the turn-buckle connections 27 as shown in Fig. 2.

Surrounding the shaft 6 is a movable collar 28, which acts as a weight. This collar is connected by means of the cables 29 to the cables 30, which connect the ends of the arms 17 when the latter are extended (see Fig. 8). The cables 29 pass over pulleys 31 carried by the collar 15.

On the ends of the arms 17 is arranged a series of cages 32 which are arranged with seats in tiers, as shown at 33 in Fig. 4. These seats accommodate passengers, and each cage is designed to hold twelve passengers. The cages are suspended from the arms by means of the cables 34. On the platform 8 are built auxiliary platforms 35 having uprights 36 against which the sides of the cages abut when the latter are in the lower position, as shown in Fig. 4. Platforms 37 extend from the base 1 over the platform 8, and underneath the platform 35. These platforms 37 are provided with guard rails 38 and 39, the latter being inclined, so as to permit the outward swinging of the cages.

The driving mechanism for turning the shaft 6 comprises a power shaft 40 provided with a beveled gear 41 meshing with a similar bevel gear 42 on the lower end of the shaft 6.

The means for turning the platform together with the substructure consists of the power gears 43 and 44 (see Fig. 4). The latter turns the gear 45 which is connected to the platform 8.

From the foregoing description of the various parts of the device the operation thereof may be readily understood.

In Fig. 10, I have shown two of the cars or cages 32, in position for receiving or discharging passengers. The passengers to be discharged pass out by means of the steps marked "Exit," while those entering do so by the steps marked "Admission." When the cars are filled the power shaft 40 is rotated in one direction, thereby rotating the shaft 6. As will be seen from Fig. 4, the rotation of the shaft 6 will cause the collar 21 to be lifted, and this in turn will cause an upward movement of the arms 19 and the outward movements of the arm 17, so as to swing the cages outwardly in the directions indicated by the arrows in Fig. 4. This movement will continue until the arms reach the position shown in Fig. 1. As the arms spread out, the stay wires 30 are stretched taut (see Fig. 8) and the weight 28 is drawn upwardly into the position shown in Fig. 1. Now the power wheels 43 are revolved thereby causing the turning of the platform 8 and the substructure above it. The cars are, therefore, carried around in a circle at a considerable distance above the ground, thus allowing the occupants to obtain a good view of the exposition grounds and of the surrounding country. When, now, it is desired to lower the cages, the shaft 40 is revolved in the reverse direction and the arms 19 together with the arms 17 are lowered. It is merely a matter of adjustment to bring the cages to rest upon the platforms 35 designed to receive them.

In order to hold the device stationary, while the cars are being loaded, or emptied, I provide a locking member 47, which is provided with a rack 48 arranged to be operated by a pinion 49. The upper end of the locking member 47 enters a recess in the bottom of the platform 8, thereby locking it and preventing rotation. The cars are unloaded and are filled again, while in their lower position and the process may be repeated as often as necessary.

It will be seen that with this device there is positive action in raising the cars, and in rotating them. The cars are raised solely by the screw action, and this action also gives tremendous mechanical advantage, so that engines of relatively small horse power may be used.

In order to add attractiveness to the device, I may place some objects, such as a globe 48 and a flag 49 above it. It is obvious that other ornamental devices may be used, without departing in the least from the spirit and the scope of the invention.

I claim:

1. In an amusement device, a base provided with a central recess and with an annular run-way concentric with said central recess, a main shaft disposed centrally of said recess and provided with a threaded portion, a circular platform having a series of wheels disposed in said annular run-way, said platform being concentric with the axis of said shaft, but being free of the shaft, auxiliary platforms carried by said circular platform, a fixed collar secured to said main shaft, a loose collar rotatably carried upon said fixed collar, a series of outwardly extending arms pivotally connected to said loose collar, a series of cages pivotally suspended from the outer ends of said arms, a series of vertical guide members carried by said circular platform and disposed about said shaft, a spider loosely disposed on said shaft and provided with rollers adapted to enter said guide ways, a threaded collar secured to said spider, a series of braces pivotally secured at one end to said outwardly extending arms and at the other end to said threaded collar, stay wires connecting the ends of said outwardly extending arms, a collar suspended from said fixed collar and provided with pulleys, a movable collar beneath said suspended collar, a series of cables having one end attached to the said wires and the other end attached to said movable collar, said cables passing over the pulleys in said suspended collar, means for rotating said main shaft, and means for rotating said platform, the last-named means being disposed in the central recess in said base.

2. In an amusement device, a base, a main shaft disposed centrally of said base and provided with a threaded portion, a circular platform concentric with the axis of said shaft, but free of the shaft, means for rotatably supporting said platform upon said base, a fixed collar secured to said main shaft, a loose collar rotatably carried upon said fixed collar, a series of outwardly extending arms pivotally connected to said loose collar, a series of cages pivotally suspended from the outer ends of said arms, a series of vertical guide members mounted on said circular platform and disposed about said shaft, a spider loosely disposed about said shaft and provided with rollers adapted to enter grooves in said guide members, a threaded collar on said shaft, a series of members pivoted at one end to said threaded collar and at the other end to said arms, means for rotating said main shaft, and means for rotating said platform.

3. In an amusement device, a base, a main shaft disposed centrally of said base and provided with a threaded portion, a circular platform concentric with the axis of said shaft, said platform being provided with an opening through which the shaft extends, a series of upwardly extending guides mounted on said platform, braces for said guides, a collar loosely disposed on said main shaft, a series of outwardly extending arms pivoted to said collar, means for supporting said loose collar, a threaded collar disposed upon said shaft, means coöperating with said upright guides for guiding the movement of said threaded collar, braces pivotally secured to said threaded collar at one end and to the outwardly extending arms at the other, means for rotating said main shaft, and means for rotating said platform independently of said main shaft.

4. In an amusement device, a base, a main shaft disposed centrally of said base and provided with a threaded portion, a circular platform concentric with the axis of said shaft, said platform being provided with an opening through which the shaft extends, a series of upwardly extending guides mounted on said platform, a collar loosely disposed on said main shaft, a series of outwardly extending arms pivoted to said collar, means for supporting said loose collar, a threaded collar disposed upon said shaft and adapted to engage the threads on said threaded portion, means coöperating with said upright guides for guiding the movement of said threaded collar and a series of braces pivotally connected at one end to said threaded collar and at the other end to said outwardly extending arms.

5. In an amusement device, a main shaft having a threaded portion, a series of outwardly extending arms, means disposed upon said main shaft for pivotally and revolubly connecting said outwardly extending arms, a threaded collar disposed on said main shaft and adapted to be engaged by the threads of said shaft, pivoted braces connecting said collar with said arms, and means for rotating said main shaft to cause a movement of said collar along said shaft, thereby causing the raising and lowering of said outwardly extending arms.

6. In an amusement device, a base, a platform rotatably mounted thereon, a main shaft centrally disposed in said platform and adapted to pass through the latter, outwardly extending arms pivotally and revolubly secured to said shaft at its upper portion, a threaded collar disposed upon said shaft and adapted to be engaged by the threads on said shaft, pivoted braces connecting said collar and said outwardly extending arms, means for rotating said main shaft independently of said platform, means for rotating said platform, and means carried by said platform and connected with said braces for causing the rotation of the latter when the platform is rotated.

7. In an amusement device, a base, a platform rotatably carried thereby, a main shaft extending through said platform, a series of arms pivotally and revolubly carried by said main shaft, means for revolving said main shaft independently of said arms, means for causing the raising and lowering of said arms by the revolution of said main shaft, and means for rotating said pivoted arms independently of said main shaft.

VINCENT H. DAVISON.

Witnesses:
H. W. THOMPSON,
H. C. OAKLEY.